(12) United States Patent  (10) Patent No.: US 8,868,939 B2
Matsuoka et al.  (45) Date of Patent: Oct. 21, 2014

(54) PORTABLE POWER SUPPLY DEVICE WITH OUTLET CONNECTOR

(75) Inventors: Yoshimichi Matsuoka, Cupertino, CA (US); Manjirnath Chatterjee, San Francisco, CA (US)

(73) Assignee: QUALCOMM Incorporated, San Diego, CA (US)

( * ) Notice: Subject to any disclaimer, the term of this patent is extended or adjusted under 35 U.S.C. 154(b) by 422 days.

(21) Appl. No.: 13/173,252

(22) Filed: Jun. 30, 2011

(65) Prior Publication Data

US 2012/0005495 A1  Jan. 5, 2012

Related U.S. Application Data

(63) Continuation-in-part of application No. 12/620,478, filed on Nov. 17, 2009, now Pat. No. 8,527,688, and a continuation-in-part of application No. 12/478,766, filed on Jun. 4, 2009, which is a continuation-in-part of application No. 12/239,656, filed on Sep. 26, 2008, now Pat. No. 8,385,822.

(60) Provisional application No. 61/142,617, filed on Jan. 5, 2009, provisional application No. 61/142,560, filed on Jan. 5, 2009, provisional application No. 61/142,194, filed on Dec. 31, 2008, provisional application No. 61/142,195, filed on Jan. 1, 2009, provisional application No. 61/142,602, filed on Jan. 5, 2009.

(51) Int. Cl.
*G06F 1/00* (2006.01)
*G06F 1/26* (2006.01)
*G06F 1/16* (2006.01)

(52) U.S. Cl.
CPC ............... *G06F 1/26* (2013.01); *G06F 1/1632* (2013.01)
USPC .......... 713/300; 455/41.1; 320/107; 320/108; 320/111

(58) Field of Classification Search
CPC ......... H02J 7/025; H02J 5/005; H02J 7/0027; G06F 1/26
USPC ............... 320/107, 108, 111; 455/41.1–41.3; 713/300
See application file for complete search history.

(56) References Cited

U.S. PATENT DOCUMENTS 5,136,414 A    8/1992  Jenkins
5,284,151 A *  2/1994  Onoda ........................ 600/523
5,375,226 A   12/1994  Sano et al.
(Continued)

FOREIGN PATENT DOCUMENTS

CN  1204929 A  1/1999
CN  1592197 A  3/2005
(Continued)

OTHER PUBLICATIONS

Omar et al. Engineering Design for Car Induction Charger for Mobile Phone. 2012.*

(Continued)

*Primary Examiner* — Matthew D Spittle
(74) *Attorney, Agent, or Firm* — Mahamedi Paradice LLP (57) ABSTRACT

One or more embodiments include an outlet interface that is configured to mate with an electrical outlet. The outlet interface is provided as an integral structure of the housing.

20 Claims, 7 Drawing Sheets

(56) References Cited

U.S. PATENT DOCUMENTS

| | | | |
|---|---|---|---|
| 5,455,466 A * | 10/1995 | Parks et al. | 307/104 |
| D366,470 S | 1/1996 | Youens | |
| 5,596,567 A | 1/1997 | de Muro et al. | |
| 5,600,225 A | 2/1997 | Goto | |
| 5,666,530 A | 9/1997 | Clark et al. | |
| 5,708,819 A * | 1/1998 | Dunnihoo | 713/323 |
| 5,733,313 A | 3/1998 | Barreras et al. | |
| 5,760,580 A | 6/1998 | Tyren | |
| 5,831,348 A | 11/1998 | Nishizawa | |
| 5,930,304 A * | 7/1999 | Hollenbeck et al. | 375/316 |
| 5,958,051 A | 9/1999 | Renaud et al. | |
| 6,006,274 A | 12/1999 | Hawkins et al. | |
| 6,091,965 A | 7/2000 | Voroba et al. | |
| 6,138,245 A | 10/2000 | Son et al. | |
| 6,184,651 B1 * | 2/2001 | Fernandez et al. | 320/108 |
| 6,266,539 B1 | 7/2001 | Pardo | |
| D448,385 S | 9/2001 | Oross | |
| 6,330,436 B1 | 12/2001 | Zidel | |
| 6,389,423 B1 | 5/2002 | Sakakura | |
| 6,405,049 B2 | 6/2002 | Herrod et al. | |
| 6,436,299 B1 | 8/2002 | Baarman et al. | |
| 6,445,936 B1 | 9/2002 | Cannon et al. | |
| 6,452,197 B1 | 9/2002 | Ito | |
| 6,463,545 B1 * | 10/2002 | Fisher et al. | 713/340 |
| 6,501,364 B1 | 12/2002 | Hui et al. | |
| 6,510,424 B1 | 1/2003 | Ford et al. | |
| 6,532,152 B1 | 3/2003 | White et al. | |
| 6,667,881 B2 | 12/2003 | Oross et al. | |
| 6,671,700 B1 | 12/2003 | Creemer et al. | |
| 6,673,250 B2 | 1/2004 | Kuennen et al. | |
| 6,731,071 B2 | 5/2004 | Baarman | |
| 6,762,583 B2 * | 7/2004 | Ho et al. | 320/107 |
| 6,795,110 B1 | 9/2004 | Kossin | |
| 6,803,744 B1 | 10/2004 | Sabo | |
| 6,806,649 B2 | 10/2004 | Mollema et al. | |
| 6,810,405 B1 | 10/2004 | LaRue et al. | |
| 6,812,645 B2 | 11/2004 | Baarman | |
| 6,825,620 B2 | 11/2004 | Kuennen et al. | |
| 6,831,417 B2 | 12/2004 | Baarman | |
| 6,850,986 B1 | 2/2005 | Peacock | |
| 6,888,438 B2 | 5/2005 | Hui et al. | |
| 6,892,052 B2 * | 5/2005 | Kotola et al. | 455/41.2 |
| 6,917,163 B2 | 7/2005 | Baarman | |
| 6,975,198 B2 | 12/2005 | Baarman et al. | |
| 6,986,051 B2 | 1/2006 | Le Pennec et al. | |
| 7,065,658 B1 | 6/2006 | Baraban et al. | |
| 7,077,045 B2 * | 7/2006 | Dietrich et al. | 89/6 |
| 7,116,200 B2 | 10/2006 | Baarman et al. | |
| 7,118,240 B2 | 10/2006 | Baarman et al. | |
| 7,126,450 B2 | 10/2006 | Baarman et al. | |
| 7,132,918 B2 | 11/2006 | Baarman et al. | |
| 7,149,473 B1 | 12/2006 | Lindlar et al. | |
| 7,164,255 B2 | 1/2007 | Hui | |
| 7,202,783 B2 * | 4/2007 | Want et al. | 340/568.1 |
| 7,236,742 B2 * | 6/2007 | Hall et al. | 455/41.3 |
| 7,248,017 B2 | 7/2007 | Cheng et al. | |
| 7,262,700 B2 | 8/2007 | Hsu | |
| 7,271,569 B2 * | 9/2007 | Oglesbee | 320/108 |
| 7,286,880 B2 | 10/2007 | Olson et al. | |
| 7,313,364 B2 * | 12/2007 | Morimoto | 455/41.2 |
| 7,314,364 B2 | 1/2008 | Mahoney et al. | |
| 7,331,793 B2 | 2/2008 | Hernandez et al. | |
| 7,352,567 B2 * | 4/2008 | Hotelling et al. | 361/679.55 |
| 7,375,492 B2 * | 5/2008 | Calhoon et al. | 320/108 |
| 7,382,636 B2 | 6/2008 | Baarman et al. | |
| 7,385,357 B2 | 6/2008 | Kuennen et al. | |
| 7,392,059 B2 | 6/2008 | White et al. | |
| 7,414,380 B2 | 8/2008 | Tang et al. | |
| 7,446,672 B2 | 11/2008 | Johnson et al. | |
| 7,454,170 B2 | 11/2008 | Goossens et al. | |
| 7,462,951 B1 | 12/2008 | Baarman | |
| 7,471,200 B2 * | 12/2008 | Otranen | 340/572.1 |
| 7,471,986 B2 | 12/2008 | Hatlestad | |
| 7,495,414 B2 | 2/2009 | Hui | |
| 7,509,432 B1 | 3/2009 | Peacock | |
| 7,518,267 B2 * | 4/2009 | Baarman | 307/150 |
| 7,521,890 B2 | 4/2009 | Lee et al. | |
| 7,528,323 B2 * | 5/2009 | Wu et al. | 174/66 |
| 7,562,813 B2 | 7/2009 | Humphrey et al. | |
| 7,565,108 B2 * | 7/2009 | Kotola et al. | 455/41.2 |
| 7,567,657 B2 | 7/2009 | Foxenland | |
| 7,576,514 B2 | 8/2009 | Hui | |
| 7,576,657 B2 * | 8/2009 | Duron et al. | 340/572.7 |
| 7,589,285 B2 | 9/2009 | Matsumoto et al. | |
| 7,643,798 B2 * | 1/2010 | Ljung | 455/41.3 |
| 7,743,151 B2 | 6/2010 | Vallapureddy et al. | |
| 7,751,810 B1 * | 7/2010 | Bernoske et al. | 455/419 |
| 7,791,311 B2 | 9/2010 | Sagoo | |
| 7,800,044 B1 | 9/2010 | Kahn et al. | |
| 7,808,664 B2 | 10/2010 | Wang et al. | |
| 7,812,257 B2 * | 10/2010 | Gunderman et al. | 174/66 |
| 7,855,529 B2 | 12/2010 | Liu | |
| 7,887,341 B2 * | 2/2011 | Liao | 439/131 |
| 7,906,936 B2 * | 3/2011 | Azancot et al. | 320/108 |
| D640,976 S | 7/2011 | Matsuoka | |
| D641,367 S | 7/2011 | Morabito | |
| 8,026,693 B2 | 9/2011 | Burley | |
| 8,026,694 B2 * | 9/2011 | Kamijo et al. | 320/108 |
| 8,060,214 B2 * | 11/2011 | Larson et al. | 607/61 |
| 8,098,043 B2 * | 1/2012 | Lin | 320/108 |
| 8,143,848 B2 * | 3/2012 | Navid | 320/113 |
| 8,169,185 B2 * | 5/2012 | Partovi et al. | 320/108 |
| 8,234,509 B2 * | 7/2012 | Gioscia et al. | 713/300 |
| 8,310,200 B2 * | 11/2012 | Matouka et al. | 320/108 |
| D674,391 S | 1/2013 | Chatterjee | |
| 8,373,387 B2 * | 2/2013 | Bourilkov et al. | 320/108 |
| 8,378,625 B2 * | 2/2013 | Gourley | 320/107 |
| 8,380,998 B2 * | 2/2013 | Azancot et al. | 713/300 |
| 8,415,920 B2 * | 4/2013 | Liao | 320/111 |
| D687,038 S | 7/2013 | Chatterjee | |
| 2001/0007815 A1 * | 7/2001 | Philipsson | 455/41 |
| 2002/0065045 A1 | 5/2002 | Kim | |
| 2002/0084698 A1 | 7/2002 | Kelly et al. | |
| 2002/0103008 A1 | 8/2002 | Rahn et al. | |
| 2003/0048254 A1 * | 3/2003 | Huang | 345/163 |
| 2003/0092386 A1 | 5/2003 | Miklos et al. | |
| 2003/0092389 A1 * | 5/2003 | Morimoto | 455/66 |
| 2003/0214255 A1 | 11/2003 | Baarman et al. | |
| 2003/0233455 A1 | 12/2003 | Leber et al. | |
| 2004/0088012 A1 | 5/2004 | Kroll et al. | |
| 2004/0130915 A1 | 7/2004 | Baarman | |
| 2004/0130916 A1 | 7/2004 | Baarman | |
| 2004/0150934 A1 | 8/2004 | Baarman | |
| 2004/0192206 A1 | 9/2004 | Hirvonen | |
| 2004/0222751 A1 | 11/2004 | Mollema et al. | |
| 2004/0232845 A1 | 11/2004 | Baarman et al. | |
| 2004/0259499 A1 | 12/2004 | Oba et al. | |
| 2005/0007067 A1 | 1/2005 | Baarman et al. | |
| 2005/0030160 A1 * | 2/2005 | Goren et al. | 340/10.5 |
| 2005/0093475 A1 | 5/2005 | Kuennen et al. | |
| 2005/0116650 A1 | 6/2005 | Baarman | |
| 2005/0122058 A1 | 6/2005 | Baarman et al. | |
| 2005/0122059 A1 | 6/2005 | Baarman et al. | |
| 2005/0127849 A1 | 6/2005 | Baarman et al. | |
| 2005/0127850 A1 | 6/2005 | Baarman et al. | |
| 2005/0135573 A1 | 6/2005 | Harwood et al. | |
| 2005/0186903 A1 | 8/2005 | Forbes et al. | |
| 2006/0041420 A1 | 2/2006 | Martin et al. | |
| 2006/0061958 A1 | 3/2006 | Solomon et al. | |
| 2006/0094405 A1 * | 5/2006 | Dupont | 455/414.1 |
| 2006/0123055 A1 | 6/2006 | Atkinson et al. | |
| 2006/0132045 A1 | 6/2006 | Baarman | |
| 2006/0145660 A1 | 7/2006 | Black et al. | |
| 2006/0183462 A1 * | 8/2006 | Kolehmainen | 455/411 |
| 2006/0229027 A1 * | 10/2006 | Wang et al. | 455/73 |
| 2006/0242278 A1 | 10/2006 | Hawkins | |
| 2006/0258289 A1 * | 11/2006 | Dua | 455/41.3 |
| 2007/0024238 A1 | 2/2007 | Nakade et al. | |
| 2007/0035917 A1 | 2/2007 | Hotelling et al. | |
| 2007/0064406 A1 | 3/2007 | Beart | |
| 2007/0077965 A1 * | 4/2007 | Fox | 455/557 |
| 2007/0120752 A1 | 5/2007 | Takasu | |
| 2007/0182367 A1 | 8/2007 | Partovi | |
| 2007/0188284 A1 | 8/2007 | Dobbs | |

(56) References Cited

U.S. PATENT DOCUMENTS

| | | |
|---|---|---|
| 2007/0246546 A1 | 10/2007 | Yoshida |
| 2007/0255435 A1 | 11/2007 | Cohen et al. |
| 2007/0290654 A1 | 12/2007 | Govari et al. |
| 2008/0133918 A1 | 6/2008 | You et al. |
| 2008/0148350 A1 | 6/2008 | Hawkins et al. |
| 2008/0196086 A1 | 8/2008 | Shintani et al. |
| 2008/0231537 A1 | 9/2008 | Rofougaran et al. |
| 2008/0269927 A1* | 10/2008 | Szolyga et al. ............. 700/94 |
| 2008/0278894 A1 | 11/2008 | Chen et al. |
| 2009/0001932 A1 | 1/2009 | Kamijo et al. |
| 2009/0001941 A1 | 1/2009 | Hsu et al. |
| 2009/0008148 A1 | 1/2009 | Mashino |
| 2009/0034591 A1 | 2/2009 | Julian et al. |
| 2009/0069869 A1 | 3/2009 | Stouffer et al. |
| 2009/0088077 A1* | 4/2009 | Brown et al. ............. 455/41.2 |
| 2009/0096413 A1 | 4/2009 | Partovi et al. |
| 2009/0106567 A1 | 4/2009 | Baarman |
| 2009/0146608 A1 | 6/2009 | Lee |
| 2009/0170433 A1 | 7/2009 | Rhodes et al. |
| 2009/0193500 A1 | 7/2009 | Griffin et al. |
| 2009/0199219 A1* | 8/2009 | Rofougaran et al. ........ 719/330 |
| 2009/0203399 A1* | 8/2009 | Rofougaran ............. 455/556.1 |
| 2009/0212637 A1 | 8/2009 | Baarman et al. |
| 2009/0212737 A1 | 8/2009 | Johnson et al. |
| 2009/0233623 A1 | 9/2009 | Johnson |
| 2009/0322278 A1 | 12/2009 | Franks et al. |
| 2010/0007449 A1 | 1/2010 | Tait et al. |
| 2010/0021176 A1 | 1/2010 | Holcombe et al. |
| 2010/0023204 A1 | 1/2010 | Basir et al. |
| 2010/0045269 A1 | 2/2010 | LaFranchise et al. |
| 2010/0070219 A1 | 3/2010 | Azancot et al. |
| 2010/0076524 A1 | 3/2010 | Forsberg et al. |
| 2010/0081377 A1 | 4/2010 | Chatterjee et al. |
| 2010/0081473 A1 | 4/2010 | Chatterjee et al. |
| 2010/0081483 A1 | 4/2010 | Chatterjee et al. |
| 2010/0083012 A1 | 4/2010 | Corbridge et al. |
| 2010/0093279 A1 | 4/2010 | Linsky et al. |
| 2010/0121965 A1 | 5/2010 | Chatterjee |
| 2010/0131691 A1 | 5/2010 | Chatterjee et al. |
| 2010/0146308 A1 | 6/2010 | Gioscia et al. |
| 2010/0156193 A1 | 6/2010 | Rhodes et al. |
| 2010/0172090 A1 | 7/2010 | Chatterjee |
| 2010/0174801 A1 | 7/2010 | Tabaaloute |
| 2010/0177476 A1 | 7/2010 | Hotelling et al. |
| 2010/0194336 A1 | 8/2010 | Azancot et al. |
| 2010/0198453 A1 | 8/2010 | Dorogusker et al. |
| 2010/0211785 A1 | 8/2010 | Park et al. |
| 2010/0250986 A1 | 9/2010 | Black et al. |
| 2010/0257251 A1 | 10/2010 | Mooring et al. |
| 2010/0283599 A1 | 11/2010 | Ma et al. |
| 2011/0028091 A1 | 2/2011 | Higgins et al. |
| 2011/0076941 A1 | 3/2011 | Taveau et al. |
| 2011/0084660 A1* | 4/2011 | McSweyn ............. 320/111 |
| 2011/0227527 A1* | 9/2011 | Zhu et al. ............. 320/108 |
| 2012/0015605 A1 | 1/2012 | Sole |
| 2012/0032632 A1* | 2/2012 | Soar ............. 320/108 |
| 2012/0042087 A1 | 2/2012 | Berg et al. |
| 2012/0077432 A1* | 3/2012 | Rose et al. ............. 455/41.1 |
| 2012/0139484 A1* | 6/2012 | Gunderman et al. ......... 320/108 |
| 2012/0174165 A1* | 7/2012 | Mondragon et al. ............ 725/75 |
| 2012/0198353 A1 | 8/2012 | Lee et al. |

FOREIGN PATENT DOCUMENTS

| | | |
|---|---|---|
| CN | 1956288 A | 5/2007 |
| CN | 101095272 A | 12/2007 |
| CN | 101150308 A | 3/2008 |
| CN | 101228678 A | 7/2008 |
| EP | 395469 A2 | 10/1990 |
| FR | 2601161 A1 | 1/1998 |
| GB | 2389720 B | 9/2005 |
| GB | 2399466 B | 11/2005 |
| GB | 2389767 B | 4/2006 |
| JP | 09-259241 A | 10/1997 |
| JP | H10290705 A | 11/1998 |
| JP | 11-354348 A | 12/1999 |
| JP | 3161388 B2 | 2/2001 |
| KR | 10-0836634 | 6/2008 |
| KR | 10-0863420 B1 | 10/2008 |
| KR | 10-2010-0136255 A | 12/2010 |
| WO | WO-95-03686 A1 | 2/1995 |
| WO | WO-02093811 | 11/2002 |
| WO | WO-2004-098079 A1 | 11/2004 |
| WO | WO-2005-024865 A2 | 3/2005 |
| WO | WO-2008-033670 A2 | 3/2008 |
| WO | WO-2008-044875 A1 | 4/2008 |
| WO | WO-2008-133806 A1 | 11/2008 |
| WO | WO-2009-057771 A1 | 5/2009 |
| WO | WO-2010-005324 A1 | 1/2010 |
| WO | WO-2010036501 A2 | 4/2010 |
| WO | WO-2010-062198 A1 | 6/2010 |
| WO | WO-2010-068062 A2 | 6/2010 |
| WO | 2010-077994 A2 | 7/2010 |
| WO | WO-2010-068062 A3 | 7/2010 |
| WO | WO-2010077991 A2 | 7/2010 |
| WO | WO-2010078444 A2 | 7/2010 |
| WO | WO-2010-091269 A1 | 8/2010 |
| WO | WO-2011063033 A2 | 5/2011 |
| WO | WO-2012058629 A2 | 5/2012 |

OTHER PUBLICATIONS

Niza, Basharat. Inductive Charging Technique. IJETT. vol. 4. Issue 4. Apr. 2013.*
Chawla et al. State of the Art in Inductive Charging for Electronic Appliances and its Future in Transportation. 2012 Florida Conference on Recent Advances in Robotics. May 2012.*
Noka. Nokia Wireless Charging Plate DT-900 User Guide. Issue 1.3. 2012.*
U.S. Appl. No. 11/430,786, Baraban et al.
U.S. Appl. No. 12/628,401, Chatterjee.
U.S. Appl. No. 12/840,241, Chatterjee.
U.S. Appl. No. 12/841,001, Chatterjee.
U.S. Appl. No. 12/916,388, Chatterjee et al.
U.S. Appl. No. 12/975,335, Oh et al.
U.S. Appl. No. 12/987,940, Chatterjee et al.
U.S. Appl. No. 29/323,686, Matsuoka et al.
U.S. Appl. No. 29/323,688, Matsuoka.
AdvancedCardSystems, "ACR122U NFC Contactless Smart Card Reader—URL Transfer," available at URL < http://www.youtube.com/watch?v=USImfpCZaTo >, uploaded Oct. 12, 2010.
Extended European Search Report, European Application No. 11186983.0, Apr. 24, 2012, pp. 1-15.
Hui et al., "A New Generation of Universal Contactless Battery Charging Platform for Portable Consumer Electronic Equipment," IEEE Trans Power Electronics, 20(3):620-627, (2005).
International Search Report and Written Opinion dated Aug. 20, 2010 in International Application No. PCT/US2009/069847.
International Search Report and Written Opinion dated Aug. 31, 2010 in International Application No. PCT/US2010/020054.
International Search Report and Written Opinion dated Apr. 20, 2010 in International Application No. PCT/US2009/055928.
International Search Report and Written Opinion dated Jul. 21, 2010 in International Application No. PCT/US2009/068328.
International Search Report and Written Opinion dated Jul. 28, 2010 in International Application No. PCT/US2009/068332.
International Search Report and Written Opinion mailed May 16, 2012, issued in PCT Application No. PCT/US2011/058449.
International Search Report and Written Opinion, International Application No. PCT/US2012/024202, Date of Completion: Apr. 26, 2012, Date of Mailing: Apr. 27, 2012, pp. 1-9.
Kean, Steven, "Powermat Portable Wireless Charging Mat," pp. 1-12 downloaded from http://www.bigbruin.com/content/powermat_1 on Sep. 29, 2010.
Liang et al., "An implantable bi-directional wireless transmission system for transcutaneous bilogical signal recording," Physiol. Meas. 26:83-97 (2005).

(56) References Cited

OTHER PUBLICATIONS

Mel B. W. et al., "Tablet: Personal Computer in the Year 2000", Communications of the Association for Computing Machinery, New York, NY, vol. 31, No. 6, Jun. 1, 1988, 639-646, XP000047633ISSN 0001-0782.

Opticon Users Manual DWT 7133, Nov. 2000.

Adam Pash et al. "How to Break Down the Barrier Between Your iPhone and Computer", Web Document from lifehacker Website, Oct. 6, 2010, p. 8, http://lifehacker.com/5656574/how-to-break-down-the-barrier-between-your-iphone-andcomputer.

Energizer. portable POWER for mobile devices. 2012.

Ghovanloo et al. A Wide-Band Power-Efficient Inductive Wireless Link for Implantable Microelectronic Devices Using Multiple Carriers. IEEE Transactions on Circuts and Systems. vol. 54. No. 10. Oct. 2007.

iPort. LaunchPort—the world's first inductive charging and mounting system for iPad 2. Nov. 15, 2011

Keen, I., "NFC Tags Must Offer the Right Balance of Cost and Performance," Found at URL < http://webcache.googleusercontent.comisearchai=cache:http//:www.wirelessdesignmag.com,IShowPR-PUBCODE   -055-ACCT-0031760-ISSUE-0704-RELTYPE-PR-PRODCODE-R0190-PRODLETT-A.html   >, Innovision Research and Technology Plc., 2011.

\* cited by examiner

PORTABLE POWER SUPPLY DEVICE WITH OUTLET CONNECTOR

RELATED APPLICATIONS

This application is a continuation-in-part of U.S. patent application Ser. No. 12/620,478, entitled EXTENDING DEVICE FUNCTIONALITY AMONGST INDUCTIVELY LINKED DEVICES, filed Nov. 17, 2009 now U.S. Pat. No. 8,527,688; which:

(1) claims benefit of priority to Provisional U.S. Patent Application No. 61/142,617, entitled AUDIO DOCKING STATION WITH MAGNETIC POWER COUPLING AND AUTOPAIRING, filed Jan. 5, 2009; and (2) is a continuation-in-part of U.S. patent application Ser. No. 12/478,766, filed Jun. 4, 2009, entitled INDUCTIVE SIGNAL TRANSFER SYSTEM FOR COMPUTING DEVICES; which is a continuation-in-part of U.S. patent application Ser. No. 12/239,656, filed Sep. 26, 2008 now U.S. Pat. No. 8,385,822, entitled ORIENTATION AND PRESENCE DETECTION FOR USE IN CONFIGURING OPERATIONS OF COMPUTING DEVICES IN DOCKED ENVIRONMENTS, which claims benefit of priority to the following applications: Provisional U.S. Patent Application No. 61/142,560, filed Jan. 5, 2009, entitled ELECTRICAL APPARATUS FOR REAL TIME WIRELESS POWER DELIVERY; Provisional U.S. Patent Application No. 61/142,194, filed Dec. 31, 2008, entitled PROTOCOL FOR REAL TIME POWER AND ACCESSORY DATA CONNECTION; Provisional U.S. Patent Application No. 61/142,195, filed Jan. 1, 2009, entitled TECHNIQUES FOR MAGNETICALLY COUPLING CHARGING CIRCUITS AND DEVICES; Provisional U.S. Patent Application No. 61/142,602, filed Jan. 5, 2009, entitled MAGNETIC CLASP WITH MULTIPLE ORIENTATIONS AND ORIENTATION DETECTION; wherein all of the aforementioned priority applications identified in this paragraph are hereby incorporated by reference in their entirety.

TECHNICAL FIELD

The disclosed embodiments relate to a portable power supply device for a mobile computing device.

BACKGROUND OF THE INVENTION

The use of docking stations and other accessory devices in connection with mobile computing devices (e.g., smart phones, media players, etc.) is well known. Traditionally, docking stations are used to (i) recharge or supply power to a mobile computing device, (ii) enable the mobile computing device to communicate with other devices that are connected to the docking station (e.g., enable synchronization between a mobile computing device and a personal computer), or (iii) use additional resources provided with the docking station (e.g., speakers for audio output).

In a traditional scheme, docking stations and mobile computing devices connect with each other using insertive male and female connectors. Numerous factors are taken into consideration when mobile devices are designed with connectors for use with docking stations. For example, such connectors typically take into account the ease by which users may establish the connection (e.g., how easily a user can drop the device into the cradle), as well as the mechanical reliability of the connectors. When users repeatedly mate devices with docking stations, both the mating action and the removal of the device from the docking station can strain the connector structure and its elements.

DETAILED DESCRIPTION

Embodiments described herein include a docking station that is structured to inductively charge a mobile computing device. In one embodiment, the docking station includes an inductive signal interface and an outlet plug that is integrated within a housing. The inductive signal interface inductively signals power to the outlet using power received via the outlet plug. Examples of inductive signal interfaces for use with embodiments described herein are described in, for example, U.S. patent application Ser. No. 12/239,656, entitled ORIENTATION AND PRESENCE DETECTION FOR USE IN CONFIGURING OPERATIONS OF COMPUTING DEVICES IN DOCKED ENVIRONMENTS, and U.S. patent application Ser. No. 12/841,001, entitled POWER BRIDGE CIRCUIT FOR BI-DIRECTIONAL INDUCTIVE SIGNALING, filed July 2010.

In an embodiment, a docking station is provided for a computing device. The docking station ("dock") may be used by, for example, a mobile computing device, such as a cellular or wireless telephony/messaging device. The docking station includes a housing that includes a receiving surface to receive and retain the mobile computing device. An inductive signal transfer interface is included with the housing to inductively signal at least one of power or data to the mobile computing device. The docking station further provides an output component and processing resources. The processing resources are configured to detect placement of the mobile computing device on the receiving surface. The power or data signal is received from the mobile computing device, and an output is signaled to the output component based on the received data.

One or more embodiments include an outlet interface that is configured to mate with an electrical outlet. The outlet interface is provided as an integral structure of the housing.

According to some embodiments, the docking station may also be an audio dock so as to include speakers, or other output devices. Other examples of docking stations are recited herein.

Still further, embodiments described herein also include a computer system that includes a first computing device and a second computing device that are inductively linked to one another. One of the two devices inductively signals an identifier to the other device. Upon receiving the identifier, the other device configures one or more operations. The operations are selected or otherwise configured based on the signaled identifier.

Some embodiments described herein may be implemented using programmatic elements, often referred to as modules or components, although other names may be used. Such programmatic elements may include a program, a subroutine, a portion of a program, or a software component or a hardware component capable of performing one or more stated tasks or functions. As used herein, a module or component can exist on a hardware component independently of other modules/components or a module/component can be a shared element or process of other modules/components, programs or machines. A module or component may reside on one machine, such as on a client or on a server, or a module/component may be distributed amongst multiple machines, such as on multiple clients or server machines. Any system described may be implemented in whole or in part on a server, or as part of a network service. Alternatively, a system such as described herein may be implemented on a local computer or terminal, in whole or in part. In either case, implementation of the system provided for in this application may require use of memory, processors and network resources (including data ports, and signal lines (optical, electrical, etc.)), unless stated otherwise.

Some embodiments described herein may generally require the use of computers, including processing and memory resources. For example, systems described herein may be implemented on a server or network service. Such servers may be connected to and be used by users over networks such as the Internet, or by a combination of networks, such as cellular networks and the Internet. Alternatively, one or more embodiments described herein may be implemented locally, in whole or in part, on computing machines such as desktops, cellular phones, personal digital assistances, tablet devices, or laptop computers. Thus, memory, processing and network resources may all be used in connection with the establishment, use or performance of any embodiment described herein (including with the performance of any method or with the implementation of any system).

Furthermore, some embodiments described herein may be implemented through the use of instructions that are executable by one or more processors. These instructions may be carried on a computer-readable medium. Machines shown in figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on many cell phones and personal digital assistants (PDAs)), and magnetic memory. Computers, terminals, network enabled devices (e.g., mobile devices such as cell phones) are all examples of machines and devices that utilize processors, memory, and instructions stored on computer-readable mediums.

Figure 1:
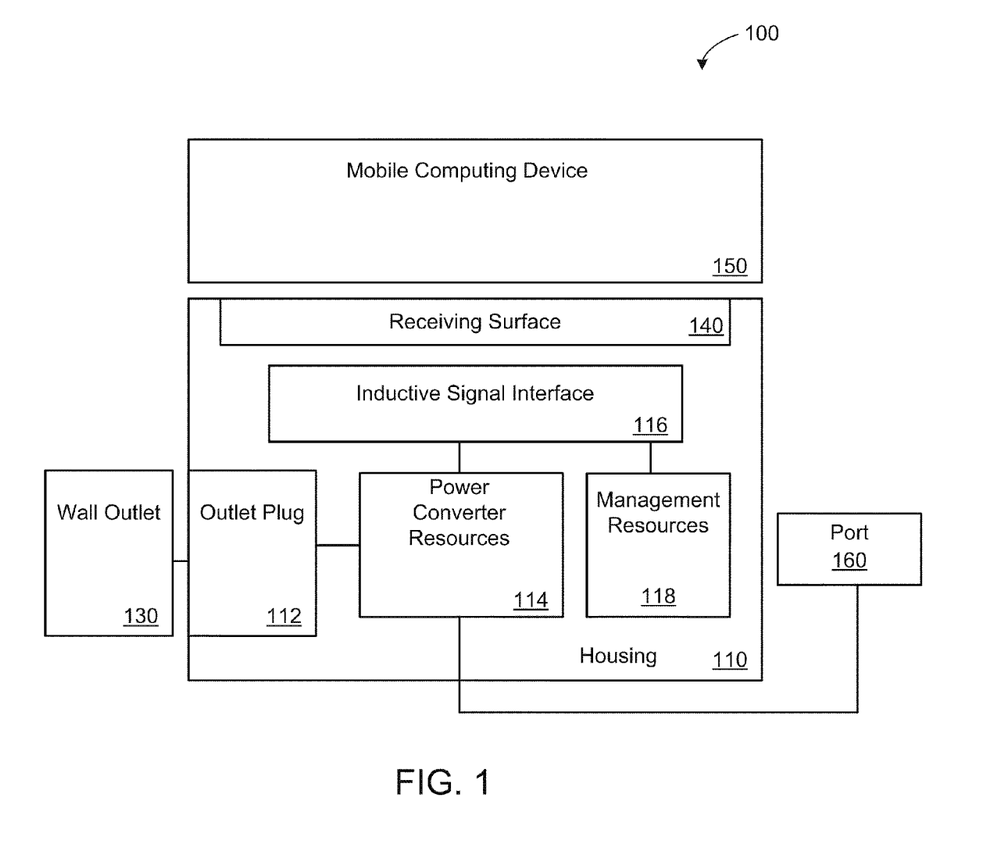
FIG. 1 illustrates a system 100 that includes a docking station that is in contact with or proximate to a mobile computing device, under an embodiment.

FIG. 1 illustrates a system 100 that includes a docking station that is in contact with or proximate to a mobile computing device, under an embodiment. System 100 enables the docking station to provide power to the mobile computing device inductively, so that the mobile computing device can receive power without physically connecting to the docking station via electrical contacts. The docking station includes an outlet interface for enabling the dock to receive power from a power source. In particular, embodiments described include an outlet interface that is an electrical plug connector for wall outlets, vehicles, or other forms of electrical receptacle power sources.

According to an embodiment, an outlet plug is configured to mate with a wall outlet to receive power from the wall outlet. A wall outlet may be an electrical outlet, such as a receptacle located in the walls or flooring of a building, connected to an AC or DC electrical source. A wall outlet may provide a continuous voltage to electrically connected devices. The wall outlet typically includes a particular configuration that is matable with a corresponding outlet. A wall outlet includes a number of small openings ("slots") containing wired electrical contacts. These slots are each configured to accept a corresponding male electrical connector (e.g., "prong"). In other embodiments, wall outlets may include one or more electrical connectors, such as male electrical connectors. When the conductive contacts located in the outlet are electrically connected with an outlet plug, electrical current flows to the receiving device. A wall outlet may also include a "ground" slot. When an outlet plug including a ground prong connects to a wall outlet including a ground slot, the ground prong may be connected to the ground slot in order to guard against electrical shock. The depth of the slots in a particular outlet may be configured as needed for a particular purpose.

Embodiments also include the use of an outlet plug that is located partially or completely within a housing of the docking station. An outlet plug may include an insertable electrical plug that may be attached to a corresponding wall outlet. A set of conductive prongs may be located on a surface or face of the electrical plug. For example, a plug may include two flat parallel metal prongs. The prongs may be in parallel or in another configuration depending on the corresponding wall outlets in use in various countries. The prongs may be polarized so that the outlet plug may only mate with a wall outlet in a particular orientation. A grounding prong may be included on the outlet plug in order to reduce the chance of electrical shock. Where the outlet plug includes prongs, the prongs may be differently sized from each other. In at least one embodiment the outlet plug is removable. In another embodiment the outlet plug within the housing may be replaceable so that a new outlet plug may be placed within.

Under the embodiment illustrated in FIG. 1, a mobile computing device is placed in contact with or proximate to a docking station for purpose of power/data transfer without use of traditional insertive or mechanically coupled connectors. However, different kinds of devices (e.g., portable devices and accessory devices) may be used with embodiments described herein. The different kinds of devices may include inductive signal interfaces that each may be inductively coupled to another device, such as an accessory device (specifically a dock or docking station). However, embodiments may also be implemented using other types of devices. In one implementation, the mobile computing device is a mufti-purpose device having cellular data and telephonic capabilities, while the accessory device corresponds to, for example, a docking station (for communications and power supply), sticky (or piggy)-back accessory, a light projector, a speaker set, or headset station. As an addition or alternative to cellular telephony/data capabilities, the mobile computing device may include, for example, functionality for use as a media player, a camera or video recorder, a global positioning unit, an ultra-mobile personal computer, a laptop computer, or a mufti-purpose computing device. Numerous other examples and implementations are described herein, including embodiments in which three or more devices are interconnected through one or more connector-less connections.

Referring to FIG. 1, in one embodiment, the docking station includes a housing 110, an outlet plug 112, power converter resources 114, and a power signal interface 116. The various blocks illustrated herein may be implemented in hardware, firmware, and/or software, and may be operatively connected. The system 100 includes a mobile computing device 150 that is electrically connected with the docking station in order to receive power and/or data from the docking station. The docking station receives power via an outlet plug 112 that is configured to mate with a wall outlet 130. The wall outlet 130 is located exterior to the housing 110 and is electrically connected to a continuous power supply (not shown). The wall outlet 130 may be a standard outlet that is provided in a house or building (e.g., provided on a wall or floor), so that various connected electronics may receive power from an AC or DC electrical source.

Embodiments herein describe the use of an outlet plug that is configured to mate with an electrical outlet. Specific examples of electrical outlets include (i) domestic AC wall outlet (e.g. 100-120V/60 Hz), (ii) non-domestic AC wall outlet (e.g. 220-240V at 50 Hz), and (iii) DC outlet (e.g. 12V automobile adapter). Wall outlets, for example, can include spaced slots to receive prongs from the outlet plug of a structure as described. The spacing and structure of the outlets can be varied, depending on presence of grounding slots, dimensional standards etc. (domestic versus European standard).

The outlet plug 112 includes a set of conductive prongs or conductive inserts that can insert into a suitably configured electrical outlet receptacle. For example, a plug may include two flat parallel metal prongs. The prongs may be in parallel or in another configuration depending on the electrical outlets that are intended for use. In variations, the prongs may be polarized so that the outlet plug may only mate with a wall outlet in a particular orientation. Still further, the prongs can include a grounding prong. In such embodiments, the prongs may be differently sized from each other. In at least one embodiment the outlet plug is removable. In another embodiment the outlet plug within the housing may be replaceable so that a new outlet plug may be placed within.

The outlet plug 112 may include an insertive electrical plug that mates with the wall outlet 130. The outlet plug 112 is provided as an integral part of the housing 110. For example, the outlet plug 112 may be provided as a static element that extends a set of prongs outward from a portable structure. Alternatively, as described with other embodiments, the outlet plug 112 may slide out from the housing 110 (e.g. switchblade structure), or alternatively pivot between retracted and extended positions.

Depending on the country in which the docking station of system 100 is used, the outlet plug 112 may be configured and/or shaped differently to accommodate the different types of wall outlet 130. For example, the outlet plug 112 may be a parallel pronged plug that plugs into parallel slots of the wall outlet 130. As discussed above, the outlet plug 112 may also include a ground plug that may properly mate with a ground slot of the wall outlet 130.

When the outlet plug 112 is properly mated/connected with the wall outlet 130, power is provided to the docking station in system 100. In one embodiment, the power converter resources 114 may interface with the outlet plug 112 to process and/or convert the received power signal so that a proper amount and/or frequency of power may be provided to the power signal interface 116. In this manner, power is transferred by the power signal interface 116 to a device that is received on the receiving surface. As described with various embodiments, the power may be signaled via conduction or inductively.

In some embodiments, the power signal interface 116 includes resources to inductively signal power to a compatible device. Accordingly, the power signal interface 116 includes, or is provided with, one or more coils to provide inductive power signal transfer to a mobile computing device 150. In some embodiments, the power signal interface 116 includes coils that are used for data transfer between the docking station of system 100 and an inductively enabled mobile computing device 150. In other embodiments, the power signal interface 116 includes or is coupled to management resources 118. Management resources 118 (e.g., a processing resource) can be included or coupled to the power signal interface 116 so that the docking station may control the inductive charging of the mobile computing device 150. The management resources can correspond to logic (e.g. an integrated circuit, or a processing resource) that controls the supply of inductive power so that a proper amount of power is delivered from the docking station. Management resources 118 may carry databases or data stores of records that contain active data items (such as described above) for synchronization or communication with a primary computer, and/or enable actions on such data items of saving the data items.

Mobile computing device 150 may be received by the housing 110 at a receiving surface 140. According to some embodiments, the housing 110 may be structured such that when the power signal interface 116 is connected to the wall outlet 130 by outlet plug 112, the receiving surface 140 may receive the mobile computing device 150. In some variations, the receiving surface 140 may include a material that may assist or enable the mobile computing device 150 to remain positioned on the receiving surface 140 (e.g., may include magnets or may include a rubber material, etc.). The manner in which the mobile computing device 150 is supported by the receiving surface 140 may vary. In one embodiment, the mobile computing device 150 is received by the receiving surface 140 by being placed on the docking station so that a face of the device 150 is retained on the docking station. Depending on the position and orientation of the receiving surface 140, the mobile computing device 150 may be supported on the receiving surface 140 in a variety of different orientations. In addition, the mobile computing device 150 may be positioned so that the device 150 may correspond to a "portrait" position, a "landscape" position, or positions in between the portrait and landscape positions. The orientation and placement of the mobile computing device 150 on the docking station will be discussed in more detail below.

According to some embodiments, the power signal interface 116 includes components for enabling inductive power and/or data transfer, so as to serve as an inductive signal interface. In other variations, the power signal interface includes electrical contacts which mate with corresponding contacts on a mating surface of another computing device. For example, as described with U.S. patent application Ser. No. 12/239,656 (which is hereby incorporated by reference), the conductive signal interface includes contact element that form a logo, and/or contact elements which electrically contact connectors that are part of the mobile devie's logo or design. The alignment of pins enables the conductive signal transfer, as further described in U.S. patent application Ser. No. 12/239,656.

According to an embodiment, the receiving surface 140 utilizes physical support structures (not shown), such as shelves, platforms, hooks or mechanical retention features, to retain the mobile computing device 150 in a docked or mated position. In another embodiment, magnetic clasps may be included or provided within the housing 110 (e.g., underneath or included in the receiving surface 140) or on the receiving surface 140 and/or the mobile computing device 150 to secure retention of the mobile computing device 150 against the dock. Priority U.S. patent application Ser. No. 12/478,763, which is incorporated by reference herein in its entirety, details the use of magnetic clasps and ferrous (or other) material in order to physically retain the mobile computing device 150 with the receiving surface 140.

Once the mobile computing device 150 is properly docked or mated with the docking station, power may be transferred between the devices. In system 100, power may be transferred from the docking station to the mobile computing device 140 so that the mobile computing device 150 may be recharged. In one embodiment, the mobile computing device 150 includes inductive power signal interface so that it may couple with the power signal interface 116 positioned within the housing 110. The mobile computing device 150 may be placed physically on the receiving surface 140 (or be brought within sufficient proximity) to receive/transmit one or both of a power and data signal. In other embodiments, the mobile computing device 150 and docking station may be placed near one another without physical contact.

Housing 110 may have a variety of different designs and/or shapes, and be made of a variety of different materials. For example, the docking station may be substantially circular, elliptical, spherical, rectangular, etc. The housing 110 may be sized as required to properly include all internal parts, but also may be sufficiently large enough to support a mobile computing device 150 that is docked or mated with the docking station. Ferrous material may be provided in order to physically retain the mobile computing device 150 in a docked position with the receiving surface 140, as discussed above.

In some embodiments, the receiving surface 140 may be located near or on the top of the docking station. This allows for an efficient and simple placement of the mobile computing device 150 on the top of the docking station. As an inductive component, the power signal interface 116 may be positioned underneath the receiving surface 140 so that power and/or data may be and efficiently transferred between the device 150 and the docking station when the device 150 is properly placed on top of the receiving surface 140. For example, the docking station may have a substantially flat and horizontal (e.g., level with a surface of a table or floor) top where the receiving surface 140 is located. This may easily enable a mobile computing device 150 to be placed on the receiving surface 140 so that it does not slide off or move. In some embodiments, magnets may be provided within the housing 110 of the docking station and the housing of the device 150 so that when the devices are properly mated or docked, the magnets assist in configuring the position of the devices. In other embodiments, the receiving surface 140 may be slanted (with respect to the level of the surface of a table or floor), e.g., from anywhere between 0 degrees to 90 degrees, for example.

The docking device or receiving surface 140 may be particularly oriented to improve the receiving of the mobile computing device 150. For example in at least one embodiment the receiving surface 140 may be at least substantially horizontal. In such an embodiment the receiving surface 140 may further be substantially horizontal when the device is electrically connected to wall outlet 130, so that when the mobile computing device 150 is received on the receiving surface it is substantially immobile. In another embodiment the outlet plug may be pivotably connected to the housing to rotate. For example, where the outlet plug includes conductive prongs, the prongs may swivel or turn, and the dock 100 may include resources to permit this movement. In one such embodiment the receiving surface 140 is stable while the outlet plug may swivel. The receiving surface 140 may thus be repositioned relative to the mobile computing device 150 in order to facilitate receiving the mobile device, for example to balance the mobile device. In further embodiments, the outlet plug 112 includes prongs that are pivotably and rotatably connected to the housing. In such embodiments the dock 100 and receiving surface 140 may be aligned in order to facilitate receiving the mobile computing device while the outlet plug 112 is plugged in to wall outlet 130.

The size of receiving surface 140 may be constructed to receive particular types of devices. For example the receiving surface 140 may be constructed to be at least the size of a face of a mobile device, so that the mobile device may be balanced on the receiving surface.

Still further, some variation provide that a port 160 to transmit and receive data and/or power may be integrated into the housing 110 or otherwise provided on the device. Port 160 may be provided in the form of a standardized wireless port, such as defined by the BLUETOOTH or WIRELESS USB standards, or may be provided in the form of a standardized physical port such as provided by USB or FIREWIRE standards. Port 160 provides for additional data/power functionality through non-power added connections or signal mediums. The external port may be connected with mobile device 150 through any of appropriately known means in the art. For example if port 160 is a physical USB port, a USB cable may be used to connect the dock 100 to additional devices. In such an embodiment, power converter resources 114 may be included to convert a power signal from wall outlet 130 into a form usable for the mobile device 150. The external port may be situated on housing 110 such that when outlet plug 112 is connected to wall outlet 130, the external port is easily accessible to the user. Among possible functions that the docking station may perform, the docking station may send or receive wireless communications with the mobile device.

Among other benefits, embodiments described herein leverage ubiquity of wall outlets, a user may easily be able to find a source for power. Furthermore, because the wall outlet plug is integrated within the housing, the user does not necessarily need a specialized power cord for the device. Still further, embodiments described herein can be structured so that when the outlet plug is connected to a wall outlet, the docking station may be physically supported by the interface connection in a position such that receiving a mobile device is facilitated.

Separable Housing

According to some embodiments, the housing 110 is comprised of multiple segments that are separable. Separable housing segments can be used to replace, for example, the outlet interface on a housing such as described herein.

Figure 2:
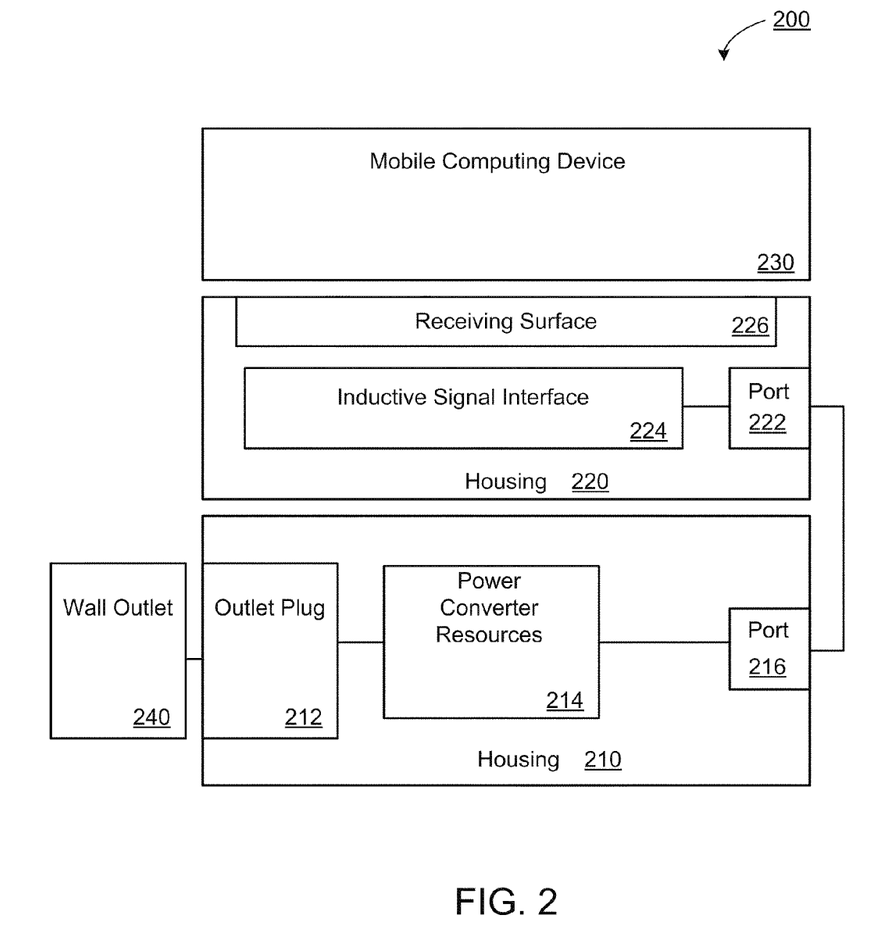
FIG. 2 illustrates an embodiment of a docking station including a first housing and a second housing.

FIG. 2 illustrates an embodiment of a docking station 200 including a first housing 210 and a second housing 220.

First housing 210 includes an outlet plug 212, a power converter 214, and a port 216. Outlet plug 212 is configured to receive a power signal from wall outlet 240. In an embodiment port 216 is configured to transmit and receive power and/or data (e.g. a FIREWIRE or USB port). In at least one embodiment outlet plug 212 may include prongs which extend outward from the housing to directly connect to electrical contacts located within the wall outlet. In such an embodiment the outlet plug may be substantially or entirely located within the housing except for the prongs, and may be electrically connected to the outlet by being plugged in. Features of the prongs, such as length, width, or orientation, may be configured to mate with particular types of wall outlets. Outlet plug 212 may include a ground, such as a grounding prong, to minimize electrical shock.

After electrical connection of outlet plug 212 with wall outlet 240, a power signal is received by power converter 214. Power converter 214 receives the power signal and converts the power signal. In an embodiment the power signal is converted into a form suitable for transmission by port 216. Port 216 may be further electrically connected to a device, where the device includes a port or other connection compatible with port 216, and thus supply power and/or data to the connected device.

Second housing 220 is configured to mate with housing 210 and includes a port 222 to transmit and receive power and/or data, an power signal interface 224, and a receiving surface 226 to receive a mobile computing device 230. Power signal interface 224 is configured to (i) receive the converted power signal via the port 222, and (ii) transmit power to the mobile computing device. Embodiments provide for the receiving surface 226 being at least substantially horizontal. Receiving a mobile device in an embodiment where the receiving surface is at least substantially horizontal may include the user locating the mobile device on the surface so that the mobile device is immobile. Embodiments provide for ports 216 and/or 222 being located externally. Other embodiments provide for the inclusion of sensor resources or management resources in housing 220 in order to assist the power signal interface 224. The receiving surface 226 may include a material that may assist or enable the mobile computing device 230 to remain positioned on the receiving surface 226 (e.g., may include magnets, may include a rubber material, etc.).

In an embodiment, connected docking station 200 is formed by mating housing 210 with housing 220. The connectors may be configured to mate specifically (e.g. only with a connector specific to the other housing) or generally (e.g. matable with at least one other type of connector, such as a generic USB port). Mating in such an embodiment may include electrically connecting the two housings by directly joining port 216 located on housing 210 with port 222 located on housing 220. Housing 220 may be detached from housing 210 to provide functionality outside of the connected docking station. An external power supply may be connected to port 222 in order to supply a power signal to power signal interface 224. In an embodiment, additional power converter electronics (not shown) such as a coil, may be provided within housing 220 connected to the power signal interface 224 and port 222 in order to convert the power signal into a usable form for power signal interface 224. The docking station of FIG. 2 may be of particular use where, for example, the user is unclear what functionality will be required, such as while traveling. In such a case the user may potentially require use of both the fully joined docking station as well as either the housing 220 including the data and/or power port or the housing 210 including the outlet plug.

Figure 3:
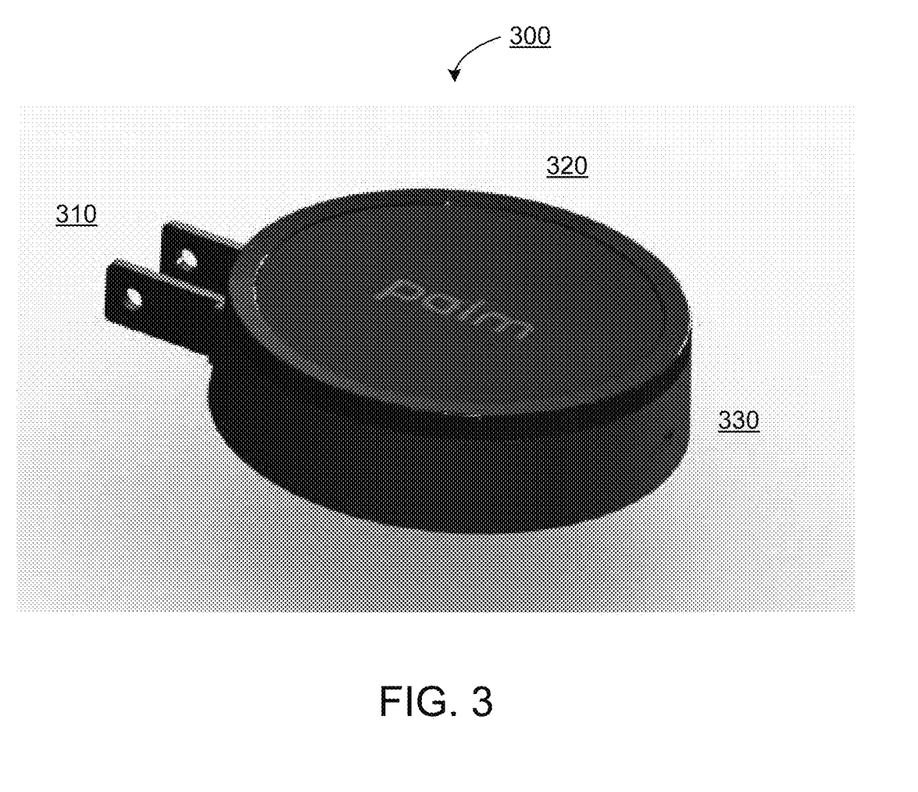
FIG. 3 illustrates a docking station according to one or more embodiments.

FIG. 3 illustrates a docking station 300, according to one or more embodiments. Outlet plug 310 is provided on the docking station to be electrically connected to a wall outlet. Receiving surface 320 is located on a top surface of the station. A mobile device may be received on surface 320. For example, while docking station 300 is plugged in, a mobile device may be balanced on receiving surface 320 by the user. The docking station 300 and receiving surface 320 may be oriented at least substantially horizontally while plugged in. A port 330 is provided within the housing and is configured to connect to a suitable adapter (e.g. USB adapter). Embodiments provide for the port 330 to transmit and receive power and/or data. In the embodiment of FIG. 3, the port 330 is located opposite of the outlet plug 310, in order to facilitate connection of port 330 to an external device while the outlet plug 310 is plugged in. Further embodiments provide for the port 330 to be located on other portions of the housing, such as the bottom of the housing, as appropriate.

Figure 4:
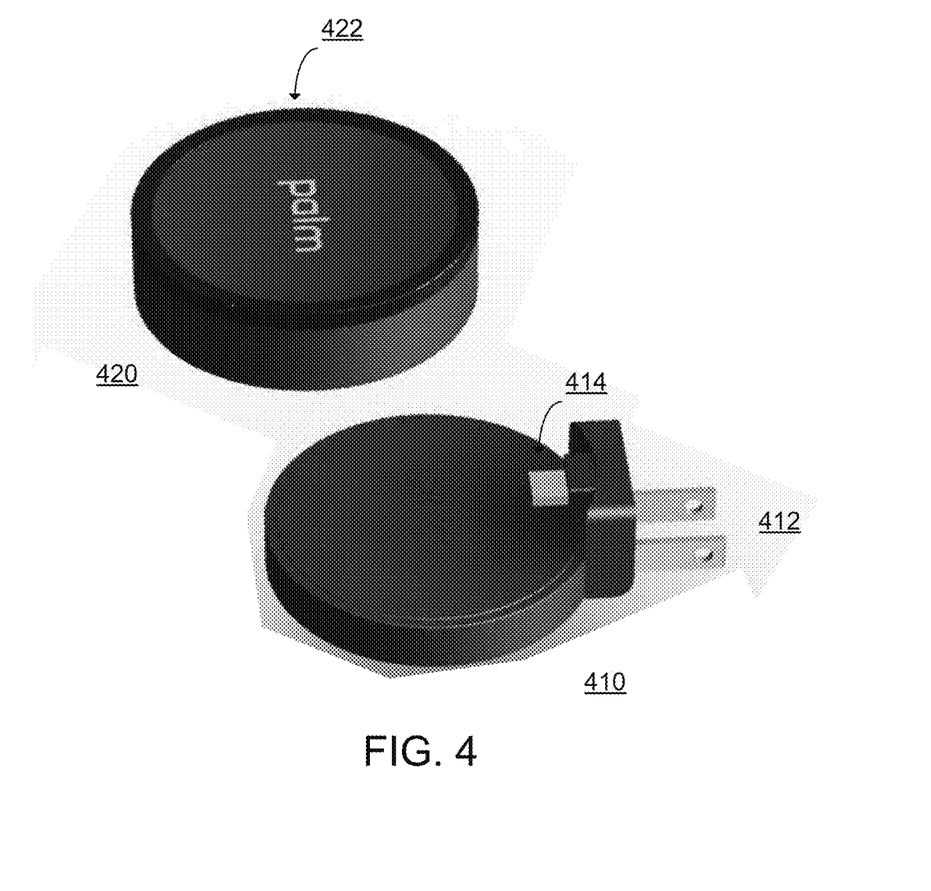
FIG. 4 illustrates a docking station that is comprised of two separable housings, according to an embodiment.

FIG. 4 illustrates a docking station that is comprised of two separable housings, according to an embodiment. First housing 410 includes an electrical outlet plug 412, an external port 414, and internal power converter resources (as described above). The second housing 420 includes a receiving surface 422 to receive a mobile computing device, an external port (as described above) configured to mate with port 414, and an power signal interface located within the second housing (as described above) that is capable of receiving a power signal from the port located on the second housing. Housings 410 and 420 may be mated by physically joining port 414 with the port located on the second housing. In such a combination, when outlet plug 412 is connected to a wall socket, a power signal is received by the internal power converter resources of housing 410. The power converter resources may convert the power signal for transmission by external port 414. The power signal is then transmitted by external port 414 to the port located on the second housing. The power signal interface then receives the converted power signal. Embodiments provide for the inclusion of sensor resources or management resources in housing 420 in order to assist the power signal interface 426.

Figure 5A:
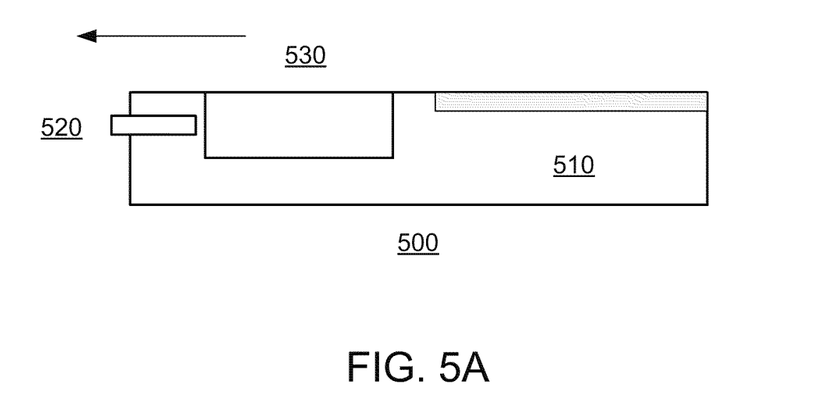
FIG. 5A and FIG. 5B illustrate a docking station including a housing and an outlet plug that is slidable between extended and retracted positions, according to an embodiment.
Figure 5B:
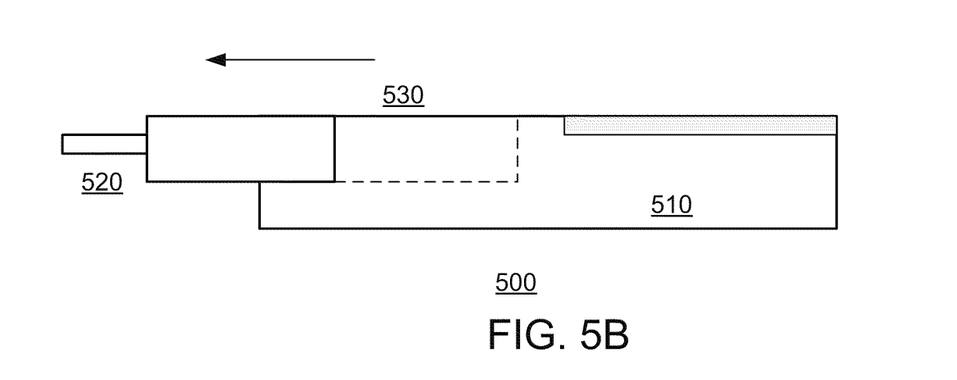

FIG. 5A and FIG. 5B illustrate a docking station 500 including a housing 510 and an outlet plug 520 that is slidable between extended and retracted positions, according to an embodiment. The outlet plug 520 includes metal prongs that are structured to slidably extend from the housing to mate with a wall outlet. In the embodiment of FIG. 5A the metal prongs are retained within the housing by use of slide 530.

In FIG. 5B, slide 530 is positioned so that the metal prongs of outlet plug 520 are fully extended from housing 510.

Figure 6A:
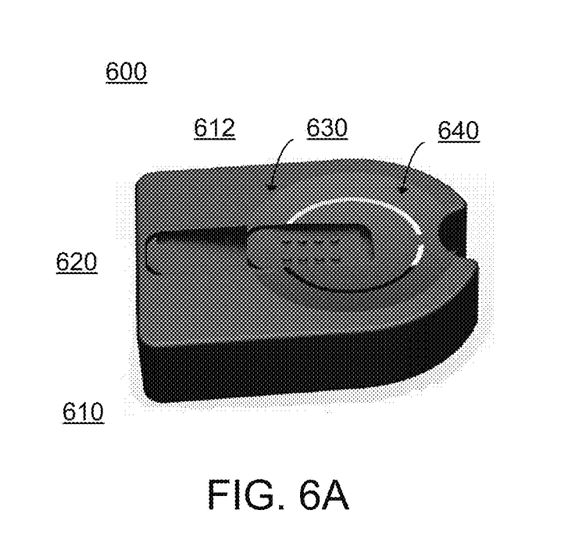
FIG. 6A and FIG. 6B illustrate a constructed docking station that slides the output plug between extended and retracted positions, in accordance with an embodiment.
Figure 6B:
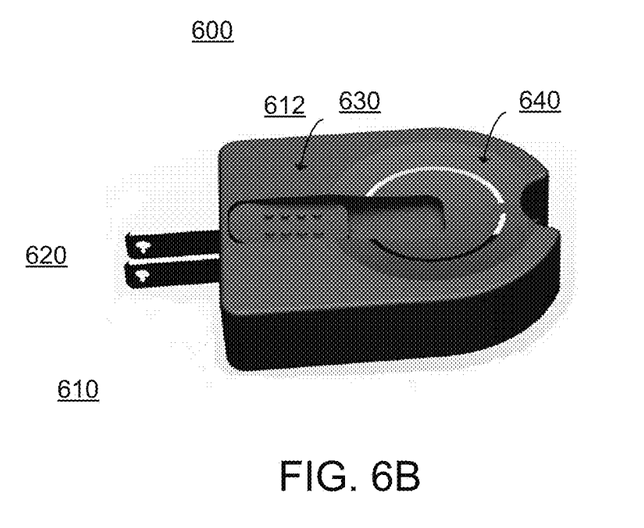

FIG. 6A and FIG. 6B illustrate a constructed docking station that slides the output plug between extended and retracted positions, in accordance with an embodiment. In FIG. 6A and FIG. 6B, a surface 612 of housing 610 includes slide 630 that the user can use to exert force, causing the extension or retraction of the prongs of the outlet plug 620 to and from the housing 610. In this way, the metal prongs of outlet plug 620 may be partially or fully extended depending on the location of slide 630. The power signal interface 640 includes a recessed and circular (or elliptical surface) on which the mobile computing device is received.

Figure 7A:
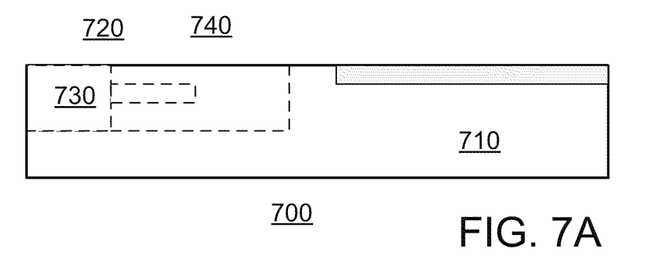
FIG. 7A through FIG. 7C illustrate a docking station including a housing and an outlet plug that is positionable between extended and retracted positions, according to an embodiment.
Figure 7B:
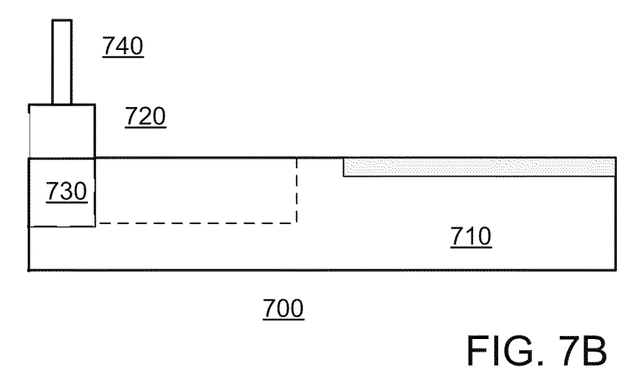
Figure 7C:
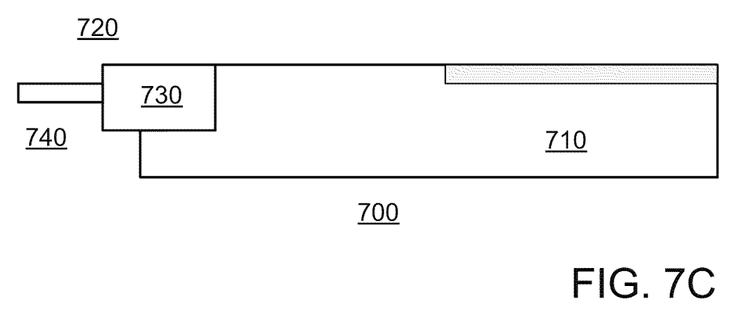

FIG. 7A through FIG. 7C illustrate a docking station 700 including a housing 710 and an outlet plug 720 that is positionable between extended and retracted positions, according to an embodiment. According to an embodiment, a pivot is included (for example with pivot 730) so that the prongs are pivotably connected to the housing 710. In such embodiments the prongs 740 rotate outward from within the housing 710 in order to mate with a wall outlet. The housing 710 may thus be oriented in order to support a mobile device being received. With reference to FIG. 7B, the outlet plug is in an intermediate position in which the outlet plug is not engaged. FIG. 7C illustrates the outlet plug extended out in an engaged position.

According to one embodiment, a mobile computing device and a docking station are individually equipped with features and components that enable charging/power signals to be communicated from the dock to the mobile computing device without use of external connectors. As an addition or an alternative, the docking station and/or the mobile computing device may exchange or transmit data signals to the other device when the mobile computing device is in contact with or proximate to the docking station (i.e., when the mobile computing device is "docked").

It is contemplated for embodiments described herein to extend to individual elements and concepts described herein, independently of other concepts, ideas or systems, as well as for embodiments to include combinations of elements recited anywhere in this application. Although embodiments are described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mentioned of the particular feature. Thus, the absence of describing combinations should not preclude the inventor from claiming rights to such combinations.

What is claimed is:

1. A power supply device, comprising:
   a first segment of the power supply device including (i) a first housing comprising a base having a first shape, (ii) an outlet interface that extends outward from a portion of the first housing to mate with a wall outlet, (iii) a first port that extends outward from the portion of the first housing towards the base and in an opposite direction of the outlet interface, and (iv) power resources to receive a power signal from the outlet interface and convert the power signal for use by a mobile computing device when the mobile computing device is coupled to the first port; and
   a second segment of the power supply device that is separable from the first segment, the second segment including (i) a second port, (ii) a second housing having a second shape that is substantially similar to the first shape and shaped to mate with the first housing by connecting the second port with the first port of the first housing and by overlaying the base of the first housing, (iii) a receiving surface to receive the mobile computing device, and (iv) a power signal interface to receive the converted power signal via the second port and to inductively transmit power to the mobile computing device when the first housing is mated with the second housing, the outlet interface is mated with the wall outlet, and the mobile computing device is positioned on the receiving surface.

2. The power supply device of claim 1, wherein the second segment further comprises management resources coupled to the power signal interface to control inductive transmission of power to the mobile computing device.

3. The power supply device of claim 1, wherein the second segment further comprises one or more sensors to detect when the mobile computing device is positioned on the receiving surface.

4. The power supply device of claim 1, wherein the receiving surface is substantially horizontal.

5. The power supply device of claim 1, wherein the outlet interface comprises prongs that extend from the first housing to mate with the wall outlet.

6. The power supply device of claim 5, wherein the prongs are pivotably connected to the first housing so that the prongs rotate outward from within the first housing in order to mate with the wall outlet.

7. The power supply device of claim 5, wherein the prongs are slidable and extend from the first housing in order to mate with the wall outlet.

8. The power supply device of claim 1, wherein the power signal interface includes one or more coils to inductively transmit data.

9. The power supply device of claim 1, wherein the first port is a universal serial bus (USB) port or a micro-USB port.

10. The power supply device of claim 1, wherein the second housing includes one or more magnets positioned underneath or within the receiving surface to enable the mobile computing device to be positioned on the receiving surface.

11. A power supply device, comprising:
    a first segment of the power supply device including (i) a first housing comprising a base, (ii) an outlet interface that extends outward from a portion of the first housing to mate with a wall outlet, (iii) a first port that extends outward from the portion of the housing towards the base and in an opposite direction of the outlet interface, and (iv) power resources; and
    a second segment of the power supply device that is separable from the first segment, the second segment including (i) a second port, (ii) a second housing that is shaped to mate with the first housing by connecting the second port with the first port of the first housing and by overlaying the base of the first housing, (iii) a receiving surface to receive a mobile computing device, and (iv) an inductive signal interface.

12. The power supply device of claim 11, wherein the second segment further comprises management resources coupled to the inductive signal interface to control inductive transmission of power to the mobile computing device.

13. The power supply device of claim 11, wherein the second segment further comprises one or more sensors to detect when the mobile computing device is positioned on the receiving surface.

14. The power supply device of claim 11, wherein the receiving surface is substantially horizontal.

15. The power supply device of claim 11, wherein the outlet interface comprises prongs that extend from the first housing to mate with the wall outlet.

16. The power supply device of claim 15, wherein the prongs are pivotably connected to the first housing so that the prongs rotate outward from within the first housing in order to mate with the wall outlet.

17. The power supply device of claim 15, wherein the prongs are slidable and extend from the first housing in order to mate with the wall outlet.

18. The power supply device of claim 11, wherein the power signal interface includes one or more coils to inductively transmit data.

19. The power supply device of claim 11, wherein the first port is a universal serial bus (USB) port or a micro-USB port.

20. The power supply device of claim 11, wherein the second housing includes one or more magnets positioned underneath or within the receiving surface to enable the mobile computing device to be positioned on the receiving surface.

* * * * *